United States Patent [19]

Nilsson

[11] 4,391,861
[45] Jul. 5, 1983

[54] PREFORM OF A THERMOPLASTIC

[75] Inventor: Claes T. Nilsson, Löddeköpinge, Sweden

[73] Assignee: PLM AB, Malmo, Sweden

[21] Appl. No.: 264,424

[22] Filed: May 18, 1981

[30] Foreign Application Priority Data

May 29, 1980 [SE] Sweden .............................. 8004003
Dec. 10, 1980 [SE] Sweden .............................. 8008653

[51] Int. Cl.³ ........................ B65D 11/16; B29F 1/10; B32B 9/04
[52] U.S. Cl. .................................... 428/35; 264/248; 264/267; 264/516; 264/523; 428/480; 428/542.8
[58] Field of Search ................... 428/35, 36, 542, 480; 264/512, 513, 515, 516, 248, 523, 134

[56] References Cited

U.S. PATENT DOCUMENTS

| | | | |
|---|---|---|---|
| 4,061,705 | 12/1977 | Marcus | 264/513 |
| 4,254,170 | 3/1981 | Roullet et al. | 428/35 X |
| 4,267,143 | 5/1981 | Roullet | 428/35 X |
| 4,289,817 | 9/1981 | Valyi | 428/542 X |
| 4,307,137 | 12/1981 | Ota et al. | 428/35 |
| 4,307,138 | 12/1981 | Powers et al. | 428/35 |
| 4,311,250 | 1/1982 | Ravve et al. | 428/35 X |

FOREIGN PATENT DOCUMENTS

| | | |
|---|---|---|
| 1397570 | 6/1975 | United Kingdom . |
| 1560952 | 2/1980 | United Kingdom . |
| 2061800 | 5/1981 | United Kingdom . |

OTHER PUBLICATIONS

Reference Disclosure "Laminar Preform for Blow Moulding" Mar. 1977, No. 155.

Primary Examiner—Thomas J. Herbert, Jr.
Attorney, Agent, or Firm—Hane, Roberts, Spiecens & Cohen

[57] ABSTRACT

A preform of thermoplastic material composed of a number of separate part-preforms fitted into one another in readiness for blow moulding to form a finished container. At least one of the part-preforms is stretched in the axial direction to provide crystallinity by monoaxial orientation. The part-preforms are singly or jointly provided with barrier layers. Different plastic materials can be used for the part-preforms as well as reprocessed plastic for one of the part-preforms. Through suitable selection of the material of the part-preforms as well as of the material of the barrier layers, it is possible to mould containers suitable for a great variety of different fields of application.

10 Claims, 10 Drawing Figures

PREFORM OF A THERMOPLASTIC

FIELD OF THE INVENTION

The present invention relates to a preform of a thermoplastic material suitable for conversion to a container and, more especially to, a preform composed of a number of part-preforms, which fit into one another, and preferably having a number of barrier layers applied to the part-preform.

PRIOR ART

It has been known to produce containers of a thermoplastic material, which containers are able to withstand an internal pressure, which arises, for example, in the case of storage of carbonated drinks, especially drinks such as fruit drinks, cola and beer. By using, for example, polyethylene terephthalate, hereafter referred to as PET, it is possible to produce containers having relatively thin walls.

However, such thin-walled PET containers are pervious to a certain extent to gases such as carbon dioxide. Oxygen from outside, as well as light, can also penetrate through the walls. This behavior has an adverse influence on the flavour of the contents of the container.

In many applications it is therefore often desirable that the container should be provided with a layer of barrier material, which only allows passage of gases or light to a very slight extent. It has been known to apply such a layer to the container by a number of different techniques. Examples of this are to apply a protective layer to the finished container, to co-extrude a blank of which one layer contains protective material, or to apply an inner or an outer protective layer to the preform.

The use of protective layers is necessary in many applications, and therefore a number of solutions have been developed for applying a protective layer of the requisite thickness to the preform prior to its conversion to the container.

In applications where the protective layer consists of a coating on the outer surface of the container, it has been found that on storage of carbonated drinks the carbon dioxide passes through the container wall and the barrier layer consequently acquires a tendency to detach from the outer surface of the container wall. In certain applications such damage to the layer means an unacceptable deterioration of the barrier properties of the container. Obviously, the layer can also be damaged by external mechanical action.

With protective layers applied to the inside of the container it is, in certain applications, difficult to find a barrier material which complies with the official regulations for the storage of foodstuffs or pharmaceuticals, or which does not affect the taste or other properties of the stored goods.

Solutions have therefore been developed, wherein the protective layer is enclosed in the container wall and wherein, as already stated above, a technique is employed which entails co-extrusion of a pipe or a tube, the walls of which have a layer of barrier material surrounded by the material of the container walls. The pipe or tube is cut off in suitable lengths and the length is closed at one end and thereafter converted to a container, for example by blowmoulding. Difficulties arise in that case in respect of producing a seal in which the barrier layer remains intact. The difficulties increase particularly in the case of a thin barrier layer.

It is highly desirable to be able to reprocess used plastic material, for example for food containers. In reprocessing plastic materials it is for many reasons inappropriate to allow the reprocessed plastic to come into contact with products stored in the containers, especially products of the foodstuff type. In order to avoid this direct contact between previously used and reprocessed plastic and the products stored in the containers, attempts have been made to use containers made of a laminated wall material, where the reprocessed material is kept away from contact with the contents of the container by a layer of virgin plastic. In this case, the abovementioned co-extrusion technique has been applied. The previously mentioned difficulties in maintaining an intact barrier layer when sealing an extruded pipe or tube obviously also apply when sealing an extruded pipe or tube where the innermost layer consists of virgin plastic, forming the protective layer for preventing contact between the reprocessed material and the interior of the container. Swedish Patent Application No. SE 7705604-2 however discloses a preform made from a co-extruded tube which is cut into lengths, after which the lengths are sealed at one end and the seal is made in such a way that the inner layer remains intact. This is achieved because during sealing the inner layer pushes back the outer layer and the central parts of the seal extends from the inner surface of the preform to its outer surface.

SUMMARY OF THE INVENTION

An object of the present invention is to provide a preform where the abovementioned disadvantages have been eliminated and which thus gives, on the one hand, an intact barrier layer and, on the other hand, intact material layers in all parts of the preform. The intact material layers therefore make it possible to reprocess previously used plastic and also ensure that the various layers of material in the container formed from the preform conform, in all parts of the container, to the requirements in respect of, for example, dimensional stability, gas penetration, light penetration and the like, which have been specified for the container. According to the invention, the preform is made by introducing an inner part-preform into an outer part-preform, the outer diameter of the inner part-preform being only slightly smaller than the inner diameter of the outer part-preform.

In an embodiment of the invention, the inner part-preform is made of virgin material and the outer part-preform of previously used and reprocessed material.

In another embodiment of the invention, the material in the two part-preforms is selected to meet the requirements regarding dimensional stability, gas penetration, light penetration and the like which are demanded of the container made from the preform.

In an alternative embodiment of the invention the preform is composed of more than two part-preforms.

In yet another embodiment of the invention, the material in at least one of the part-preforms is stretched in the axial direction, preferably to a length which essentially corresponds to the length which the profile of the container, to be produced from the preform has in its axial direction.

In yet another embodiment of the invention, the inner and/or the outer surface of a number of a part-preforms is provided with a barrier layer before the part-preforms are assembled to give the preform.

The use of two part-preforms to make up a composite preform, with the barrier layer located between the two part-preforms, provides, inter alia, the advantages that the contents of the filled container do not come into direct contact with the barrier layer of the container, and that the barrier material, through being enclosed in the container wall, has no possibility of detaching from any surface of the container.

According to an alternative embodiment of the invention, both part-preforms are provided with a barrier layer, with one of the layers preventing the passage of gases and the other the passage of light, or with one preventing the passage of oxygen and the other the passage of carbon dioxide. Preferably, the oxygen barrier is in this case applied to the outer part-preform.

In yet another alternative embodiment of the invention, one of the part-preforms, and in that case preferably the inner part-preform, is provided with two or more barrier layers on top of one another. As the barrier layers, during the heating of the composite preform and the subsequent conversion to a container, achieve good contact with, and secure enclosure between, the layers of material, the functioning of the barrier layers is ensured.

It is also possible to apply a print and/or decoration to the outer surface of one of the inner part-preforms. In that case, the design of the print and/or of the decoration is matched to the stretching of the material which occurs during the subsequent conversion of the preform to a container.

In a preferred embodiment of the invention, the material of the preform or part-preforms is stretched in the axial direction at a temperature within or preferably below the range of the glass transition temperature (TG) of the material. Preferably, the material is stretched by a mechanical procedure in which the preform is passed through one or more draw rings to reduce its wall thickness and thereby also its outer diameter. Swedish Patent Application No. SE 8004003-3 describes such a stretching procedure. Through the mechanical orientation it is consequently easy to achieve an outer diameter of the inner part-preform which exactly matches the inner diameter of the outer part-preform, including the changes in dimension involved in coating the part-preforms with barrier layers.

BRIEF DESCRIPTION OF THE DRAWING

The invention is described in more detail in relation to a number of figures, in which FIGS. 1a and b are longitudinal sectional views through part-preforms.

DETAILED DESCRIPTION

Figure 1A:
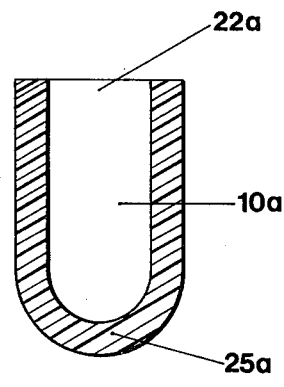
FIG. 1c is a longitudinal section through a preform composed of the part-preforms in FIGS. 1a and 1b, FIGS. 2a and b are longitudinal sectional views through axially stretched part-preforms.

FIGS. 1a and b show a part-preform 10a and a part-preform 10b, each with an orifice or mouth part 22 a, b and a sealed bottom part 25 a, b. The two part-preforms are produced by any suitable method, for example by injection moulding or by extrusion. In the latter case the sealed bottom parts are, as a rule, formed by a separate moulding step.

Figure 1B:
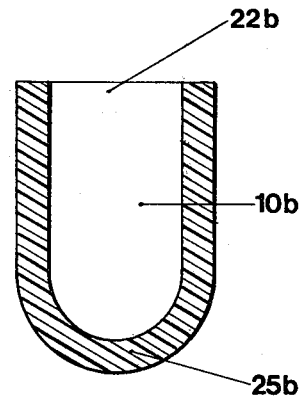
Figure 1C:
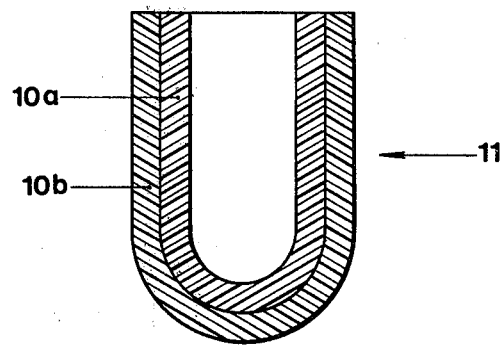

FIG. 1c shows how the two part-preforms 10a, b have been assembled to give a preform 11. In order for this to be possible, the inner diameter of the part-preform 10b is somewhat larger than the outer diameter of the part-preform 10a. Likewise, the lengths of the two part-preforms are matched to one another. FIGS. 1a–c are from this point of view not true to scale.

Figure 2A:
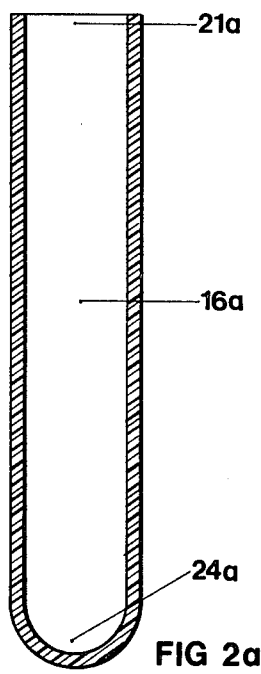
FIG. 2c is a longitudinal section through a preform composed of the part-preforms in FIGS. 2a and 2b, FIGS. 3a and 3b are longitudinal sectional views through axially stretched part-preforms coated with a barrier layer.

FIGS. 2a and b show an axially stretched part-preform 16a and an axially stretched part-preform 16b. The part-preform 16a is so dimensioned that it fits into the part-preform 16b, each having an orifice or mouth part 21a, b and a sealed bottom part 24a, b.

The two part-preforms 16a, b are obtained by moulding of part-preforms consisting essentially of amorphous material. The two part-preforms 10a, b are examples of such part-preforms. During the reshaping, the cylindrical portion of the part-preform is lengthened by a stretching procedure, with simultaneous reduction of the wall thickness. Preferably, this is carried out in such a way that the part-preform, for example one of the part-preforms 10a, b, is passed through one or more draw rings, whose inner diameter is less than the diameter of the part-preform prior to being passed through. In order to form the axially stretched part-preform shown in FIG. 2a, the stretching procedure just mentioned is completed by stretching the material in the bottom portion of the part-preform.

Figure 2C:
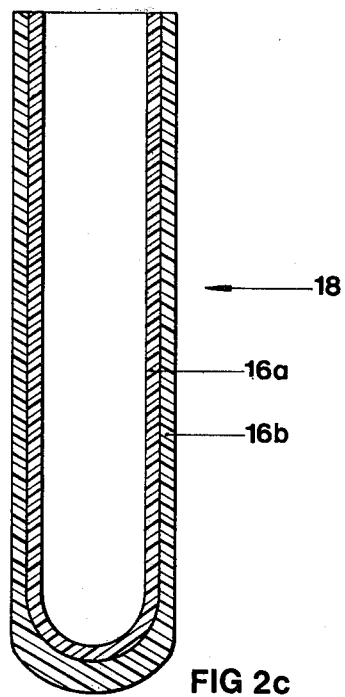

FIG. 2c shows how the two part-preforms 16a, b are assembled to give a preform 18. To make this possible, the inner diameter of the part-preform 16b is slightly larger than the outer diameter of the part-preform 16a. Likewise, the lengths of the two part-preforms are matched to one another and the mouths of the part preforms are coplanar.

FIGS. 3a–d show an embodiment of the invention wherein two part-preforms, after having undergone axial stretching in the manner just described, form stretched preforms 13a, b of such dimensions that they fit into one another. When the smaller preform 13a has been introduced into the larger preform 13b, the two preforms constitute a composite preform 15. The smaller preform 13a is provided, in the figure, with an outer barrier layer 14a, and the larger preform 13b is provided with an inner barrier layer 14b. Consequently, in the composite preform, in the transition between the two part-preforms, a zone consisting of the two barrier layers 14a, b is formed.

When using the part-preforms described above for the production of containers, the material in the composite preform is heated to the moulding temperature, after which the conversion to the container takes place e.g. by blow-moulding. It is obviously possible, before converting the respective preforms to a container, to provide the orifice or mouth part of the respective preforms with a requisite closure arrangement, for example threads and the like, for the final container. It is also possible, according to the invention, to start from preforms which before axial stretching are provided with such closure arrangements.

It has been explained above that the axial stretching of the preforms is carried out by passing the preforms through draw rings of successively decreasing diameter. The invention is obviously applicable also to production processes in which the axial stretching of the preforms is carried out by other means. For the embodiment of the invention in which axially stretched part-preforms constitute a composite axially stretched preform, it is obviously necessary that the stretching method employed should result in part-preforms which conform to the tolerances which allow the part-preforms to fit into one another.

By applying the barrier layers to axially stretched preforms, the barrier layers are applied to a surface which, for a finished container of the same size, is substantially larger than in the case of the previously used technique of coating unstretched preforms with barrier layers. When using, for example, PET, it is in many applications desirable to achieve a biaxial orientation of the material whereby the material is stretched at least about 3-fold in one of the axial directions. Thereby the material i.a. acquires the mechanical properties required for the particular applications. Stretching the material 3-fold in each of the axial directions means that the surfaces of the preform and the surfaces of the container are in the ratio of about 1:9, which in turn implies that the thickness of the barrier layer present on the preform is reduced in the same proportion. In certain applications, the requisite properties are obtained by about 3-fold monoaxial stretching followed by a lesser transverse stretching. In applications where the aforesaid stretching ratio is employed, certain embodiments of the invention provide that the barrier layer is reduced at most 3-fold, which in turn brings the advantage that the barrier layer of the preform does not have to be as thick as when the previously used technique is employed. Since the application of a thick barrier layer means a difficult step in connection with the production of containers, the invention implies a considerable simplification of the production process. Since the preforms undergo axial stretching and subsequent transverse stretching during moulding (following the application of the barrier layer), the preforms are stretched in the axial direction to a length which essentially corresponds to the length of the profile of the moulded container in its axial direction.

Especially when using a composite preform, there is, in certain examples of applications, an advantage in allowing the final hardening of the barrier layer as well as its bonding to the material of the part-preform to take place when the two part-preforms are placed inside one another. As a result of the barrier layer being hardened only when the part-preforms have been placed inside one another and preferably in conjunction with the heating of the preform to the moulding temperature of the material, good contact of the barrier layers with one another is achieved. Even when only one barrier layer is employed, the aforesaid procedure results in good contact with the material in the part-preform which is devoid of a barrier layer.

According to the invention, one or several barrier layers are applied to the respective preforms by dipping in a solution containing a barrier material. In an alternative embodiment, the barrier layer is sprayed onto the preform. Other coating processes can, of course, also be employed within the scope of the invention.

Figure 2B:
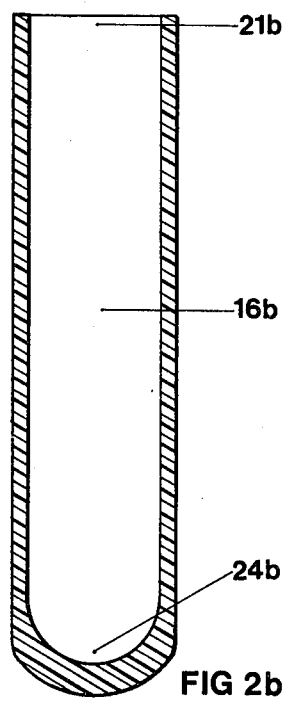
Figure 3D:
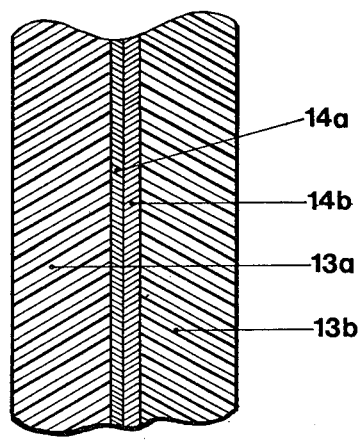
FIG. 3c is a longitudinal section through a preform composed of the part-preforms in FIGS. 3a and 3b and FIG. 3d is an enlarged section of a detail A in FIG. 3c.
Figure 3A:
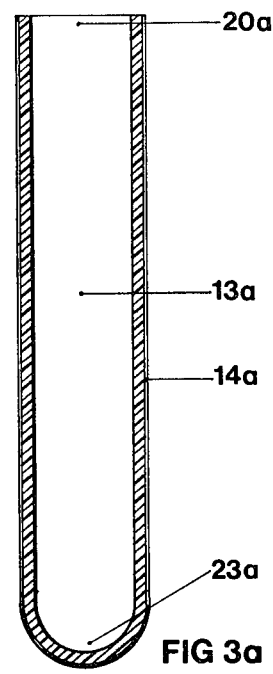
Figure 3C:
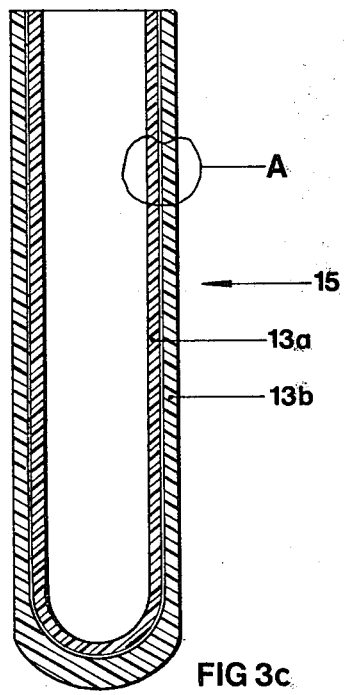
Figure 3B:
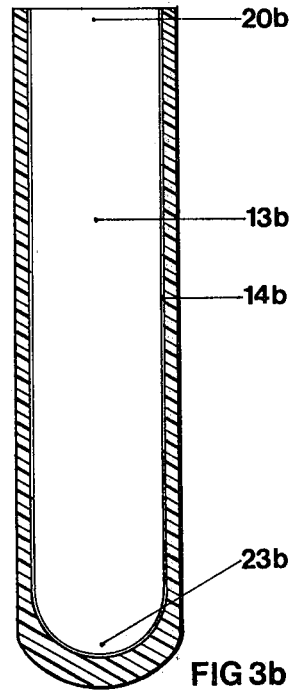

Even though not all of the embodiments of the invention which have been included in the summary of the invention have been illustrated in detail per se in connection with the detailed description, it will clearly emerge from the said description that all embodiments are included in the variants of preforms (assembled from part-preforms) as described in connection with FIGS. 1-3.

The crystallinity of a part-preform is in the case of polyethylene terephthalate, normally allowed to reach a maximum level of approximately 30% when the object is to undergo further re-shaping. Crystallinity is preferably allowed to lie between 10-25%, whereas the crystallinity produced by monoaxial orientation will achieve a maximum value of approximately 17%.

The crystallinity values stated in the present application relate to the theories disclosed in the publication "Die Makromolekulare Chemie" 176, 2459-2465 (1975).

Tubular preforms of circular cross-section have have shown in the above description. The invention may, of course, also be applied to tubular blanks of other cross-sections.

A large number of materials of polyester or polyamide type known, however, and have characteristics similar to those of polyethylene terephthalate. Thus the invention as such is also applicable either in whole or in part to these materials, provided that the reductions in thickness and the temperatures are adjusted to suit the specific requirements of the respective material. The following are typical materials for which the present invention is suitable, after the indicated adjustments have been made: polyethylene terephthalate, polyhexamethylene adipamide, polycaprolactam, polyhexamethylene sebacamide, polyethylene-2,6- and 1,5-naphthalate, polytetramethylene-1,2-dioxybenzoate, and copolymers of ethylene terephthalate, ethylene isophthalate, and other similar plastics polymers.

I claim:

1. An expandable preform assembly capable of being blow molded to a container, said assembly comprising inner and outer distinct, interfitted part-preforms of tubular shape with opposite open and closed ends, each of said part-preforms being constituted of a thermoplastic material capable upon molding of being joined to the other part-preform to form a container having inner and outer layers respectively conforming to said part-preforms, at least one of said interfitted part-preforms being axially stretched, prior to molding, to provide crystallinity obtained by monoaxial orientation.

2. An assembly as claimed in claim 1 wherein said inner part-preform has an outer surface in contact over substantially the entire extent thereof with the inner surface of the outer part-preform, said open ends being coplanar.

3. An assembly as claimed in claim 1 wherein said at least one part-preform which has crystallinity due to axial stretching is substantially resistant to further axial stretching but is capable of undergoing circumferential stretching upon molding to a container.

4. An assembly as claimed in claim 1 wherein said at least one part-preform is constituted by PET which is axially stretched three times its original length to provide said crystallinity.

5. An assembly as claimed in claim 4 wherein said material of said outer part pre-form consists of previously used and reprocessed material.

6. An assembly as claimed in claim 4 wherein the crystallinity of the said one part-preform is between 10 and 25%.

7. An assembly as claimed in claim 4 wherein the stretched length of said one part-preform prior to molding substantially corresponds to the length of the profile of the formed container in the axial direction after molding.

8. An assembly as claimed in claim 7 wherein said at least one part-preform which has crystallinity due to axial stretching is substantially resistant to further axial stretching but is capable of undergoing circumferential stretching upon molding to a container.

9. An assembly as claimed in claim 4 wherein said part-preforms have mating surfaces at least one of which includes a barrier layer applied thereto.

10. An assembly as claimed in claim 9 wherein said barrier layer is applied on said at least one part-preform.

* * * * *